United States Patent [19]
Curtis

[11] Patent Number: 6,075,528
[45] Date of Patent: Jun. 13, 2000

[54] GRAPHICAL USER INTERFACE STREAM PROCESSOR

[75] Inventor: Bryce Allen Curtis, Round Rock, Tex.

[73] Assignee: International Business Machines Corporation, Armonk, N.Y.

[21] Appl. No.: 08/954,647

[22] Filed: Oct. 20, 1997

[51] Int. Cl.[7] .................................................. G06F 15/00
[52] U.S. Cl. .......................... 345/333; 345/356; 707/513; 707/203; 709/220; 709/240
[58] Field of Search .................................... 345/333, 356; 707/513, 203; 709/220, 246

[56] References Cited

U.S. PATENT DOCUMENTS 5,802,530  9/1998  Van Hoff ................................. 707/513

Primary Examiner—Ba Huynh
Attorney, Agent, or Firm—Robert V. Wilder; Leslie A. Van Leeuwen

[57] ABSTRACT

A method and implementing computer system is provided in which a function or applet for example may be downloaded from a network server and graphical user interface (GUI) processor interprets a data stream consisting of GUI controls and attributes, and places the controls and attributes in a presentation space. In an exemplary embodiment, a web browser program loads an HTML (Hypertext Markup Language) from a GUI (Graphical User Interface) stream processor applet from a web server. The web browser then loads the GUI stream processor (GSP) from the web server and begins executing the GSP. The GSP then requests the GUI stream from the web server by opening a stream to a file, CGI (Common Gateway Interface) script or servlet on the server. The GSP then receives the GUI stream and assembles the user interface in the JAVA applet presentation space managed by the browser. The GSP may periodically update itself by repeating the last two steps.

15 Claims, 2 Drawing Sheets

GRAPHICAL USER INTERFACE STREAM PROCESSOR

FIELD OF THE INVENTION

The present invention relates generally to information processing systems and more particularly to a methodology and implementation for facilitating graphical user interface changes for user applications.

BACKGROUND OF THE INVENTION

In network computer systems, a plurality of computers are connected together and one or more of the computers generally perform the function of a network server. A network may be established through the hard-wired interconnection of a plurality of computer terminals in a local network or on a wider scale such as the Internet or world wide web which may include telecommunication links. In any case, the network server acts as the central control unit for providing access to files, programs and program execution to the individual computers connected within the network. In general, a networked computer terminal will .logon. to the network and obtain access to a network server. The network server will download a homepage presentation on the user's terminal which may include and audio and video effects. From the initial screen display, a user may designate any other .address. to get to another .location. or screen display. The user may also select from a plurality of functions which may be presented for user selection on the initial display.

Generally, almost all screen displays include designated selection areas on the screen where the user may point a selection device such as a mouse-controlled pointer, and .click. on the designated screen area to invoke a displayed function, or menu for other function selection options. When the homepage or selection screen is downloaded from the server, many small programs or .applets. are also downloaded at the same time to the user's terminal memory. Those applets are associated with different ones of the designated screen selection areas and are executed when a user makes a selection or clicks on one of the selection areas on the display. The applets, in turn, may call for the presentation of a new user interface screen, or a new or different section of a portion of the screen, such as a pop-up menu or other graphical user interface (GUI) which may be within a framed or windowed sub-section of the main homepage.

The GUI presentation is typically designed and customized to present an attractive display and facilitate use of the computer interface by a user in making subsequent selections or executing selected functional aspects associated with the GUI presentation. The GUI display is typically displayed as the end result of the execution of a program downloaded from the server in response to the user selection of a designated screen area. The design and display of the GUI screen is typically determined in advance and .hard-coded. by a programmer. Thus, on the Internet for example, there is no flexibility for different JAVA applet user interfaces to be readily created when the content of the web server changes dynamically. In general, this hard-coded GUI program, which resides at the site of the server, has been difficult and time consuming to modify or make even the smallest change. If the GUI presentation screen needed to be changed in any aspect, the GUI program would have to be re-written, de-bugged, hard-coded and re-installed on the server. Further, if other aspects of the GUI presentation needed to be changed at a later time, the same process would apply. As a result, the GUI screens tend to remain the same without ever changing to any great extent. This is unattractive to a user who may wish to look at different screens to minimize an otherwise tedious search on the Internet for example, and also cumbersome to a network provider who may wish to change GUI screen appearance's on a regular basis to enhance the appeal of the particular function with which the GUI is associated. Moreover, with an improved methodology for changing GUI presentations, the GUI displays to the user can be more easily and quickly modified with relative ease and cost to a network provider. Further, sponsorship for GUI displayed functions may be incorporated and readily changed at short notice to accommodate various sponsoring entities or functional program providers or contributors.

Thus, there is a need for an improved GUI presentation methodology which is effective to facilitate and accommodate frequent changes to the displayed interface whereby a GUI interface program may be modified quickly and easily by a network server in providing a greater selection of GUI presentations to network users.

SUMMARY OF THE INVENTION

A method and implementing computer system is provided in which a GUI stream processor interprets a data stream consisting of GUI controls and attributes, and places the controls and attributes in a presentation space. In an exemplary embodiment, a web browser program loads an HTML (Hypertext Markup Language) from a GUI (Graphical User Interface) stream processor applet from a web server. The web browser then loads the GUI stream processor (GSP) from the web server and begins executing the GSP. The GSP then requests the GUI stream from the web server by opening a stream to a file, CGI (Common Gateway Interface) script or servlet on the server. The GSP then receives the GUI stream and assembles the user interface in the JAVA applet presentation space managed by the browser. The GSP may periodically update itself by repeating the last two steps.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
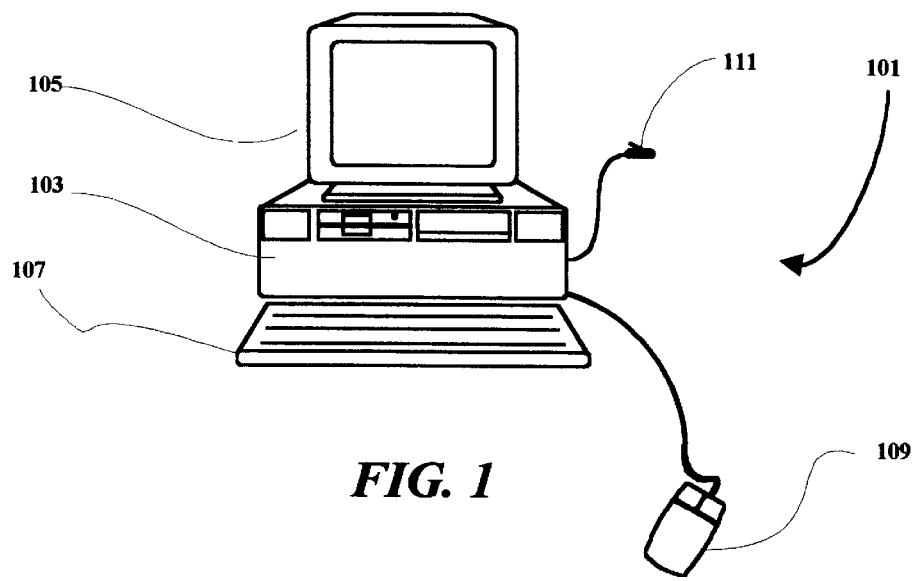
FIG. 1 is a diagram of a computer system in which the present invention may be implemented.

With reference to FIG. 1, the various methods discussed herein may be implemented within a computer network including a computer terminal 101, which may comprise either a workstation or a PC for example. In general, an implementing computer system may include computers configured with a plurality of processors in a multi-bus system in a network of similar systems. However, since the workstation or computer terminal 101 implementing the present invention in an exemplary embodiment, is generally known in the art and composed of electronic components and circuits which are also generally known to those skilled in the art, circuit details beyond those shown in FIG. 1, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor unit 105, a keyboard 107 and a mouse or pointing device 109, which are all interconnected with the computer terminal illustrated. Also shown is a connector 111 which is arranged for connecting a modem within the computer terminal to a communication line such as a telephone line in the present example. The present invention may also be implemented in a cellular system.

Figure 2:
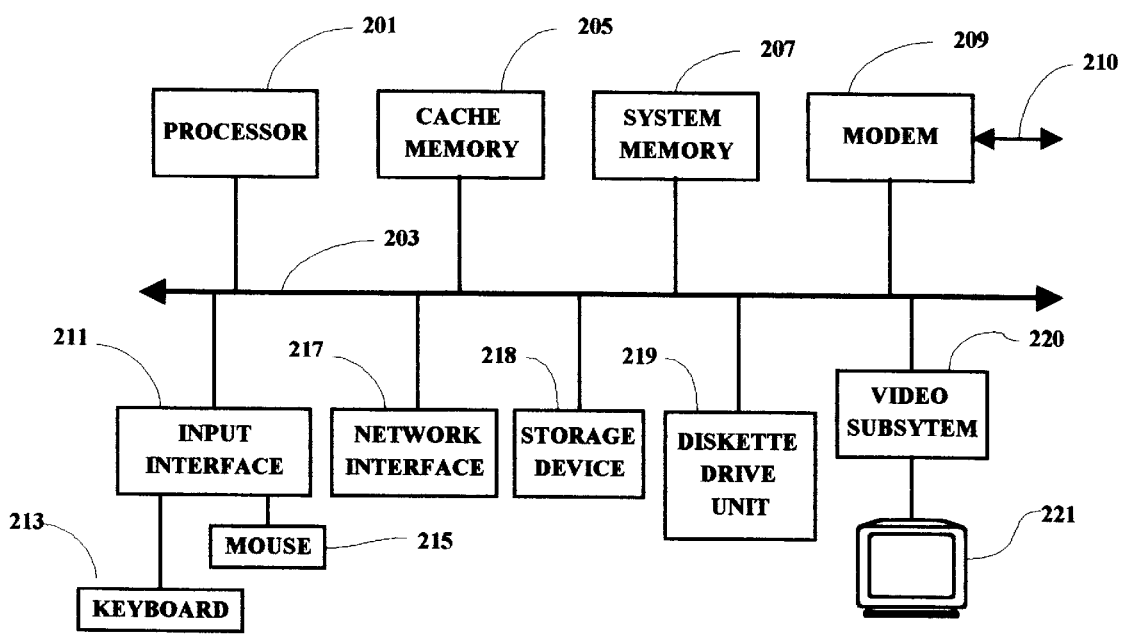
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with network server, such as the Internet.

The system bus 203 is also connected through an input interface circuit 211 to a keyboard 213 and a mouse or pointing device 215. The bus 203 may also be coupled through a hard-wired network interface subsystem 217. A diskette drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer terminal 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer terminal 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the program. In general, a user will make selections from a home page display screen using the keyboard 213 or the mouse or pointer device 215. In an Internet operating program, the selections made by the user will determine .where. the user .goes., i.e. to what .site. or .webpage., and also, in some cases, the communications link or the path taken to get to the site selected.

Figure 3:
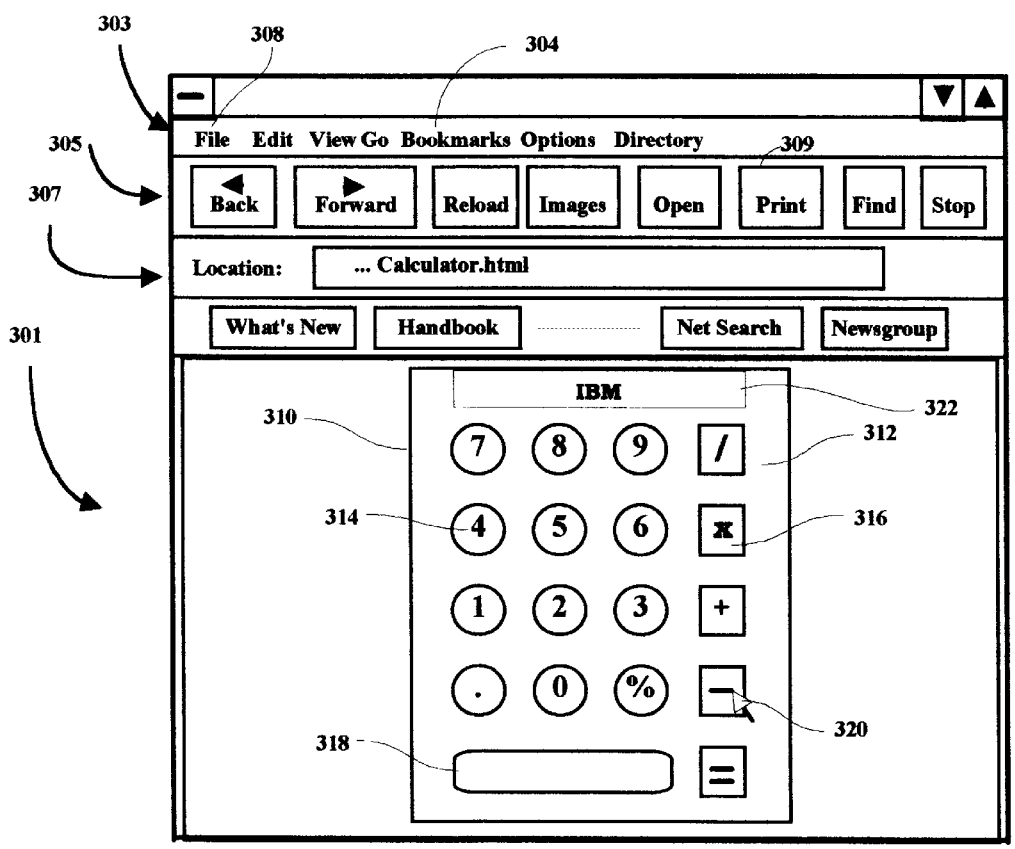
FIG. 3 is an illustration of an exemplary display screen of a typical web page for reference in explaining the present invention.

FIG. 3 illustrates a typical program screen display 301 in an Internet operating session. The browser screen generally includes a mode row 303 which displays several different modes which the user may select such as the .File. selection 308 and the .Bookmarks. selection 304. Another row 305 may be displayed to help a user quickly move through documents, sites, or pages in a network application. An address or .location. section 307 enables a user to key-in, and also displays the name of, an internet address of a site to be, or being, visited. In the present example, the location designation is a .calculator. function which may be keyed into the location field 307 or clicked on by means of an icon from a previous page. Other quick access buttons may be implemented on the screen for quick access to other selected network services and/or network functions such as .What's New. or .Net Search. In general, any of the illustrated items may be selected through a .point and click. methodology associated with the mouse device 215, and a cursor or pointer 320 visible on the display screen. For example, a download of data from a remote site may be immediately terminated during the transmission by pointing to the .Stop. button and clicking on a designated mouse button. Similarly, the .Back. and .Forward. buttons may be used to return to the last screen display or go forward to the next screen display, respectively.

In the FIG. 3 example, the .location. or Uniform Resource Locator (URL) designation is illustrated as . . . Calculator.html. The exemplary webpage shows a calculator function and image which has been downloaded from a server in response to a user selection of the appropriate URL or .location. The illustrated calculator function includes a calculator outer frame or edge 310. Also illustrated is a faceplate 312. Within the face of the illustrated calculator frame 310 are typical buttons including numerical buttons 314 and function buttons 316 as well as a .results. area 318 for displaying the results of entered calculations. Also illustrated is a display area 322 which may be used to display the identity of a sponsoring entity. Typically, a user will use a selector arrow 320 to select numbers and functions to perform a desired calculation. It is noted that even the simple calculator example includes many attributes and variables which may be changed in the display of the calculator image. For example, the numerical .buttons. 314 can assume a variety of aspects such as different colors, different patterns or apparent textures, different shapes (round, square, oblong etc.) and even different numerical designations. Similarly, the function buttons 316 and the backplate 312 may take on many different appearances. Also text can assume different values for font type and/or font size. Furthermore the combination of the different attributes, including different colors, shapes, sizes and fonts may be varied to present a large number of possible combination presentations of the displayed GUI screen.

The calculator display shown in FIG. 3 is typically generated by a program or application or applet that is downloaded from a network server and executed at the user terminal in response to a calculator-related screen selection entered by the user. The downloaded application program generally includes hard code for all of the information defining the appearance of the calculator. The application generally cannot be altered or modified except by writing a new application program and installing the new application at the server to define and create a new calculator design. With the program and methodology of the present invention, the creating program is designed to retrieve a data file from the server in defining the attributes and characteristics of the calculator GUI in the present example. The data file is a separate segment of code residing at the server which may be easily modified, by using only a file editor, by a network administrator or program developer to effect a changed appearance or display of the calculator function when it is downloaded by a user. The calculator application or applet is opened after which the code is processed, the calculator image is built or created and the user is then able to use the calculator displayed at the user's terminal.

One of many possible pseudocode listings which could be implemented to practice the disclosed methodology is presented below.

```
class myApplet extends Applet {
    // Creats object to save GUI controls into
    Hashtable guiControls = new Hashtable( );
    // Applet initialization method
    void init( ) {
            // Open stream to file or URL
            Stream stream = openStream(File or URL);
            // Process stream
            processStream(stream);
    }   stream.close;
    // Process the GUI stream
    void processStream(Stream stream) {
            // Read from stream until all controls are read
            while leof(stream) {
                    // Read GUI control class name and attributes
                    Vector controlVector = stream.readVector( );
                    // Build GUI control
                    buildControl(controlVector);
            }
    }
    // Build GUI control
    Object buildControl(Vector controlVector) {
            // Get class
            String controlClass = controlVector.elementAt(0);
            // Get unique name of control
            String controlName = controlVector.elementAt(1);
            // Get number of parameters for constructor
            int numConstructorParameters =
            controlVector.elementAt(2)
            // Get parameters for constructor
            int i = 3;
            Vector constructorParameters = new Vector( );
            for (int j=0; j<numConstructorParameters; j++) {
                    constructorParameters.addElement
                    (controlVector.elemantAt(i));
                    i++;
            }
            // Create control
            Object control =
            Class.forName(controlClass).newInstance
            (constructorParameters);
                    // Save unique name and control
            guiControls.put(controlName, control);
            // Set attributes on control
            while (i < control.size( )) {
                    String attribute =
            controlVector.elementAt(i);
                    int numParameters =
            controlVector.elementAt(i+1);
                    Vector parameters = new Vector( );
```

-continued

```
                    // Biuld parameter list
                    for (int j=0; j<numParameters; j++) {
                    Object value = controlVector.elementAt(i+2+j);
                            // If value is a vector, than it is another
                            // control so build it too and return the
                            new control if (value instanceof Vector)
                                    value = buildControl(value);
                            // If we need to pass ourself to a method
                            if (value.equals("this")) {
                                    value = this;
                            }
                            // Add this parameter to vector
                            parameters.add(value);
                    }
                            // Now set the attribute. The attribute is
                    // the method name to run.
                            control.attribute(value);
            }
            // Return object created
            return control;
    }
/**
* Called when any GUI event occurs
*/
public void actionPerformad(ActionEvent e) {
            // The guiControls object maps the controlName given by
            // the programmar to the control instance known by the
            // running program.
            if (e.getSource( ) == guiControls.get("Control1") {
            ...
            }
            ...
            else if (e.getSource( ) ==    guiControls.get("ControlN"){
            ...
            }
    }
}
```

Pseudocode which may be implemented to provide the calculator example shown in FIG. 3 is illustrated below. This is the stream that is read by CalcApplet. For this encoding, the first element is the class type, the second is the unique name, and the third is the number of items in the constructor.

The first item in the stream would be decoded as follows:

1. The class name is Label.
2. The unique identifier this object is known by in the program is "Company".
3. The constructor for Label takes 5 parameters.
4. The constructor is called with new Label(10, 5, 110, 15, "IBM"), where the first 4 integers are points that define where the label is to be placed on the presentation space, and the string is the text to be drawn on the presentation space.

```
Calc.stream:
    [Label, "Company", 5, 10, 5, 110, 15, "IBM"]
    [RoundButton, "Button7", 3, 10, 20, "7"]
    [RoundButton, "Button8", 3, 40, 20, "8"]
    [RoundButton, "Button9", 3, 70, 20, "9"]
    [RoundButton, "Button4", 3, 10, 50, "4"]
    [RoundButton, "Button5", 3, 40, 50, "5"]
    [RoundButton, "Button6", 3, 70, 50, "6"]
    [RoundButton, "Button1", 3, 10, 80, "1"]
    [RoundButton, "Button2", 3, 40, 80, "2"]
    [RoundButton, "Button3", 3, 70, 80, "3"]
    [RoundButton, "Button.", 3, 10, 110, "."]
    [RoundButton, "Button0", 3, 40, 110, "0"]
    [RoundButton, "Button%", 3, 70, 110, "%"]
    [SquareButton, "Button/", 3, 100, 20, "/"]
    [SquareButton, "ButtonX", 3, 100, 50, "X"]
```

```
        [SquareButton, "Button+", 3, 100, 50, "+"]
        [SquareButton, "Button-", 3, 100, 110, "-"]
        [SquareButton, "Button=", 3, 100, 140, "="]
        [TextField, "Display", 5, 10, 140, 110, 155, ""]
CalcApplet.java:
    class CalcApplet extends Applet {
        String operand1 = "";
        String operand2 = "";
        String operation = "";
        double result = 0.0;
        // Create object to save GUI controls into
        Hashtable guiControls = new Hashtable( );
        // Applet initialization method
        void init( ) {
            // Open stream to file or URL
            Stream stream = openStream("Calc.stream");
            // Process stream
            processStream(stream);
        }
            // Process the GUI stream
            void procesStream(Stream stream) {
        // Read from stream until all controls are read
        while (!eof(stream)) {
            // Raad GUI control class name and attributes
            Vector controlVector = stream.readVector( );
            // Build GUI control
            buildControl (controlVector);
            // Register for action notification when button pressed
                    guiControls.get("Button0").addActionListener(this);
            guiControls.get("Button1").addActionListener(this);
            guiControls.get("Button2").addActionListener(this);
            guiControls.get("Button3").addActionListener(this);
            guiControls.get("Button4").addActionListener(this);
            guiControls.get("Button5").addActionListener(this);
            guiControls.get("Button6").addActionListener(this),
            guiControls.get("Button7").addActionListener(this);
            guiControls.get("Button8").addActionListener(this);
            guiControls.get("Button9").addActionListener(this);
            guiControls.get("Button+").addActionListener(thie);
            guiControls.get("Button-").addActionListener(this);
            guiControls.get("ButtonX").addActionListener(this);
            guiControls.get("Button/").addActionListener(this);
            guiControls.get("Button=").addActionListener(this);
            guiControls.get("Button%").addActionListener(this);
            guiControls.get("Button.").addActionListener(this);
        }
    }
    // Build GUI control
    Object buildControl(Vector controlVector) {
                // Get class
                String controlClase = controlVector.elementAt(0);
                // Get unique name of control
                String controlName = controlVector.elementAt(1);
                // Get number of parameters for constructor
                int numConstructorParameters = controlVector.elementAt(2);
                // Get parameters for constructor
                int i = 3;
                    Vector constructorParameters = new Vector( );
                    for (int i=0; j<numConstructorParameters; j++) {
                        constructorParameters.addElement(controlVector.
                          elementAt(i));
                        i++;
                    }
                // Create control
                Object control =
                Class.forName(controlClass).newInstance
                  (constructorParameters);
                // Save unique name and control
                guiControls.put(controlName, control);
                // Set attributes on control
                while (i < control.size( )) {
                    String attribute = controlVector.elementAt(i);
                    int numParameters = controlVector.elementAt(i+1);
                    Vector parameters = new Vector( );
                    // Build parameter list
                    for (int i=0; l<numParameters; i++) {
                        Object value = controlVector.elementAt(i+2+j);
                        // If value is a vector, then it is another control
                        // so build it too and return the new control
                        if (value instanceof Vector)
                            value = buildControl(value);
                        // If we need to pass ourself to a method
                        if (value.equals("this")) {
                            value = this;
                        }
                            // Add this paremeter to vector
                        parameters.add(value);
                    }
                    // Now set the attribute. The attribute is the method
                    // name to run.
                    control.attribute(value);
                }
                // Return object created
                return control;
    }
    /**
     * Called when any GUI event occurs
     */
    public void actionPerformed(ActionEvent e) {
                // The guiControls object maps the controlName given by
                // tbe programmer to the control instance known by the
                // running program.
                if (e.getSource( ) == guiControls.get("Button0")) {
                    guiControls.get("Display").appendText("0");
                }
                else if (e.getSource( ) == guiControls.get("Button1")) {
                    guiControls.get("Display").appendText("1");
                }
                else if (e.getSource( ) == guiControls.get("Button2")) {
                    guiControls.get("Display").appendText("2");
                }
                else if (e.getSource( ) == guiControls.get("Button3")) {
                    guiControls.get("Display").appendText("3");
                }
                else if (e.getSource( ) == guiControls.get("Button4")) {
                    guiControls.get("Display").appendText("4");
                }
                else if (e.getSource( ) == guiControls.get("Button5")) {
                    guiControls.get("Display").appendText("5");
                }
                else if (e.getSource( ) == guiControls.get("Button6")) {
                    guiControls.get("Display").appendText("6");
                }
                else if (e.getSource( ) == guiControls.get("Button7")) {
                    guiControls.get("Display").appendText("7");
                }
                else if (e.getSource( ) == guiControls.get("Button8")) {
                    guiControls.get("Display").appendText("8");
                }
                else if (e.getSource( ) == guiControls.get("Button9")) {
                    guiControls.get("Display").appendText("9");
                }
                else if (e.getSource( ) == guiControls.get("Button.")) {
                    guiControls.get("Display").appendText(".");
                }
                else if (e.getSource( ) == guiControle.get("ButtonX")) (
                    operand1 = guiControls.get("Dieplay").getText( );
                    operation = "X";
                    guiControls.get("Display").clearText( );
                }
                else if (e.getSource( ) == guiControls.get("Button-")) {
                    operend1 = guiControls.get("Display").getText( );
                    operation = "-";
                    guiControls.get("Display").clearText( );
                }
                else if (e.getSource( ) == guiControls.get("Button/")) {
                    operand1 = guiControls.get("Display").getText( );
                    operation = "/";
                    guiControls.get("Display").clearText( );
                }
                else if (e.getSource( ) == guiControls.get(ButtonX")) {
                    operand1 = guiControls.get("Display").getText( );
                    operation = "X";
                    guiControls.get("Display").clearText( );
                }
                else if ((e.getSource( ) == guiControls.get("Button%")) ||
                        (e.getSource( ) == guiControls.get("Button="))) {
                    operand2 = guiControls.get("Display").getText( );
```

-continued

```
        if (operation == "+")
            result = Double(operand1).doubleValue( ) +
                Double(operand2).doubleValue( );
        else if (operation == "−")
            result = Double(operand1).doubleValue( ) −
                Double(operand2).doubleValue( );
        elee if (operation == "/")
            result = Double(operand1).doubleValue( ) /
                Double(operand2).doubleValue ( );
        else if (operation == "X")
            result = Double(operand1).doubleValue( ) *
                Double(operand2).doubleValue( );
        if (e.getSource( ) == guiContrals.get("Button%"))
            result = result / 100;
        operand1 = result;
        guiControls.get("Display").setText(String(result));
        }
    }
}
```

The GUI processor disclosed herein allows the web server to show a new user interface under the control of the server. Thus there is only one application or applet that is needed for any placement and operation of any GUI controls. Accordingly, an application or applet's user interface can be easily generated by a tool, or dynamically by the web server using methods such as servlets or CGI scripts for example. The processor allows the web server to show a new user interface under the control of the server. Thus there is only one application or applet that is needed for any placement and operation of any GUI controls. Accordingly, an application or applet's user interface can be easily generated by a tool, or dynamically by the web server using methods such as servlets or CGI scripts for example.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. In a network environment including a server device, a user terminal and means arranged to selectively connect the user terminal to the server device, a method for presenting a graphical user interface (GUI), including a plurality of GUI controls and attributes, on a display device at the user terminal, said method comprising:

downloading a document from the server device to a user network browser program, said document including GUI stream processor code;

executing said GUI stream processor code on the user terminal;

requesting a GUI data file by the GUI stream processor code from the server to the user terminal, said GUI data file including data effective to modify predetermined non-functional aspects of said controls and attributes of said GUI;

receiving said GUI data file by said user terminal; and assembling said GUI for display on the display device, said assembling being accomplished using said GUI data stream processor code and said GUI data file, said non-functional aspects of said GUI being changeable by changing said data in said data file.

2. The method as set forth in claim 1 wherein said assembling is accomplished in presentation memory space managed by the user network browser program at said user terminal.

3. The method as set forth in claim 1 wherein said requesting is accomplished by:

opening a stream from said GUI data file to said user terminal, said GUI data file being present on the server device.

4. The method as set forth in claim 1 wherein said requesting is accomplished by:

opening a stream from said GUI data file to said user terminal, said GUI data file being present in a servlet on the server device.

5. The method as set forth in claim 1 wherein said requesting is accomplished by:

opening a stream from said GUI data file to said user terminal, said GUI data file being present in a GUI related common gateway interface on the server device.

6. The method as set forth in claim 1 and further including:

periodically repeating said requesting, receiving and said assembling steps to update said GUI.

7. A network system comprising:

a server device;

a user terminal; and connection means arranged to selectively connect said server device to said user terminal, said user terminal further including a display device, said user terminal being selectively operable for running a network browser program, said display device being arranged to display a graphical user interface (GUI), including a plurality of GUI controls and attributes, said user terminal being selectively operable for downloading a document from the server device to the user network browser program, said document including GUI stream processor code;

said user terminal being operable for executing said GUI stream processor code and requesting a GUI data file from the server, said GUI data file including data effective to modify predetermined non-functional aspects of said controls and attributes of said GUI;

said user terminal being operable for receiving said GUI data file and assembling said GUI for display on the display device, said assembling being accomplished using said GUI data stream processor code and said GUI data file, said non-functional aspects of said GUI being changeable by changing said data in said data file.

8. The network system as set forth in claim 7 wherein said assembling is accomplished in presentation memory space managed by the user network browser program at said user terminal.

9. The network system as set forth in claim 7 wherein said requesting is accomplished by opening a stream from said GUI data file to said user terminal, said GUI data file being present on the server device.

10. The network system as set forth in claim 7 wherein said requesting is accomplished by opening a stream from said GUI data file to said user terminal, said GUI data file being present in a servlet on the server device.

11. The network system as set forth in claim 7 wherein said requesting is accomplished by opening a stream from said GUI data file to said user terminal, said GUI data file being present in a GUI related common gateway interface on the server device.

12. The network system as set forth in claim 7 and further including periodically repeating said requesting, receiving and said assembling steps to update said GUI.

13. A method for presenting a graphical user interface (GUI), including a plurality of GUI controls and attributes, on a display device at the user terminal, said method comprising:

loading a Java application including GUI stream processor code;

executing said GUI stream processor code on the user terminal;

requesting a GUI data file by the GUI stream processor code, said GUI data file including data effective to modify predetermined non-functional aspects of said controls and attributes of said GUI;

receiving said GUI data file by said user terminal; and assembling said GUI for display on the display device, said assembling being accomplished using said GUI data stream processor code and said GUI data file, said non-functional aspects of said GUI being changeable by changing said data in said data file.

14. The method as set forth in claim 13 wherein said data file is present on said user terminal.

15. The method as set forth in claim 13 wherein said data file is present on an associated network server device.

* * * * *